(12) United States Patent
Sugiyama

(10) Patent No.: US 7,044,295 B2
(45) Date of Patent: May 16, 2006

(54) CASE AND CASE HOLDER

(76) Inventor: Taichi Sugiyama, 2443-8, Inokuchi, Nakaimachi, Ashigarakamigun, Kanagawa 259-0151 (JP)

(*) Notice: Subject to any disclaimer, the term of this patent is extended or adjusted under 35 U.S.C. 154(b) by 0 days.

(21) Appl. No.: 10/495,107

(22) PCT Filed: Nov. 18, 2002

(86) PCT No.: PCT/JP02/11996

§ 371 (c)(1),
(2), (4) Date: May 10, 2004

(87) PCT Pub. No.: WO03/045821

PCT Pub. Date: Jun. 5, 2003

(65) Prior Publication Data

US 2004/0256255 A1 Dec. 23, 2004

(30) Foreign Application Priority Data

Nov. 26, 2001 (JP) .............................. 2001-359356

(51) Int. Cl.
*B65D 85/57* (2006.01)
*G02B 27/02* (2006.01)
(52) U.S. Cl. ................ 206/308.1; 206/232; 206/459.5; 359/438; 359/804
(58) Field of Classification Search ............. 206/308.1, 206/232, 459.1, 459.5; 359/804, 438
See application file for complete search history.

(56) References Cited

U.S. PATENT DOCUMENTS

| | | | |
|---|---|---|---|
| 3,139,977 A * | 7/1964 | Burdick ...................... 359/804 |
| 3,632,191 A * | 1/1972 | Cox ............................ 206/37 |
| 4,044,889 A | 8/1977 | Orentreich et al. |
| 4,863,026 A | 9/1989 | Perkowski |
| 5,280,385 A * | 1/1994 | Wybrow ..................... 359/438 |
| 5,366,073 A | 11/1994 | Turrentine et al. |
| 5,544,741 A | 8/1996 | Fantone et al. |
| 5,588,526 A * | 12/1996 | Fantone et al. .......... 206/308.1 |
| 5,769,227 A * | 6/1998 | Fantone .................... 206/459.1 |
| 5,782,347 A * | 7/1998 | Fantone et al. .......... 206/308.1 |
| 5,823,344 A * | 10/1998 | Fantone et al. .......... 206/459.5 |
| 5,833,068 A * | 11/1998 | Fantone .................... 206/459.1 |
| 5,850,913 A * | 12/1998 | Fantone et al. .......... 206/308.1 |
| 5,941,382 A * | 8/1999 | Fantone et al. .......... 206/308.1 |
| 6,450,343 B1 * | 9/2002 | Arnaldi .................... 206/459.5 |

(Continued)

FOREIGN PATENT DOCUMENTS

GB  2 222 143 A  2/1990

(Continued)

OTHER PUBLICATIONS

Front page of WO96/26916, dated Oct. 12, 1995.

(Continued)

*Primary Examiner*—Bryon P. Gehman
(74) *Attorney, Agent, or Firm*—Townsend & Banta

(57) ABSTRACT

A case that makes visible the surface of an object kept therein through one of its sides is provided.

The case, which comprises a top (1), a bottom (2) and at least one side (101, 201, 202), is a case for keeping an object therein, and at least one of the sides (101, 201, 202) has a transparent member which performs at least one of the functions of converging, diverging, or bending the path of, the light reflected from the object inside the case. As the transparent member, a convex lens, a concave lens or a prism can be used. Where a lens is to be used, particularly a non-central part of the lens can be suitably utilized.

6 Claims, 17 Drawing Sheets

U.S. PATENT DOCUMENTS

2004/0089567 A1* 5/2004 Nacken .................. 206/308.1

FOREIGN PATENT DOCUMENTS

| JP | 2-55309 B2 | 11/1990 |
| JP | 08011412 A | 1/1996 |
| JP | 08167263 A | 6/1996 |
| JP | 09-511203 A | 11/1997 |
| JP | 11-510129 | 7/1999 |
| JP | 58118070 A | 7/2003 |

OTHER PUBLICATIONS

Front page of WO 97/05041, dated Feb. 13, 1997.
Microfilm of the specification and drawings annexed to the request of Japanese Utility Model Application No. 190450/1985 (Laid-open No. 99581/1987).

* cited by examiner

CASE AND CASE HOLDER

TECHNICAL FIELD

The present invention relates to a case for keeping an object, more specifically a case for keeping a compact disc (CD), a CD-ROM, a DVD, a flexible disk, a similar recording medium or the like for use with computers, recording music or other purposes, and a case holder for keeping a stack of such cases as in a bookshelf.

BACKGROUND ART

Transparent plastic cases have traditionally been in popular use as containers for recording media such as CDs, CD-ROMs and DVDs for use with computers, recording music or other purposes. This kind of case typically comprises a lid and a bottom, on which the object such as a music CD is placed. The lid is opened when the CD kept therein is to be taken out. When an object such as a CD is shipped from its vendor, it comes with a label made of paper or some other material bearing the title, table of contents, and other relevant information and which is placed together with it in the case. The part of the label which fits with the spine of the case serves as an identifier, as the spine of a book would be, particularly when the case is placed upright together with a number of similar cases in a case holder. The designing, printing, and fitting of the label, which usually involves a certain amount of waste, also entails a considerable cost.

As an attempt to improve the printing procedure for such labels, Japanese Patent Laid-Open No. 8-11412 discloses a spine printing apparatus and a spine formation tool, but this pertains only to a technique to increase printing precision, rather than a way of eliminating the need for printing and fitting.

For a recording medium such as a CD that is not sold in a case with a label, the user needs to buy a universal transparent plastic case to keep or carry it. Since the spine of such a universal case bears no label indicating its contents and therefore the recording medium cannot be seen from the side of the case, it is time-consuming to locate any given recording medium among a number of similar items.

Even if a spine label is provided, it may be difficult to write on since the case is usually less than 10 mm in thickness.

Even where a spine label is provided, when the recording medium taken out of its case is to be stored again, the user may put it into a wrong case by mistake. As a result, the spine label on the case may not match the recording medium inside. It is thus a chore to ensure that every recording medium is always kept in the right case.

On the other hand, as a technique for indicating the contents of the case, for instance, U.S. Pat. No. 4,863,026 discloses a keeping case for use with information recording devices. This technique features a Fresnel lens built into the lid of the case, such that the lens magnifies the index card within the case. As similar techniques for displaying the contents through the lid of the case, National Publication of International Patent Application No. 9-511203 discloses a flat box device equipped with a multiple-view lens, and National Publication of International Patent Application No. 11-510129 discloses an indication system using a multiple-visual-angle optical element. According to these techniques, a number of miniature planoconvex lenses are provided in the lid of the case, and text and images are printed in an interlacing manner on the surface of the album card to be inserted into the back of the lid. This arrangement enables the text and images on the label to be presented to the viewer in a variety of ways depending on the angle at which the viewer sees them.

Another technique for indicating the contents of a case pertains to a cosmetic container provided with an integrated lens structure disclosed in U.S. Pat. No. 4,044,889. By this technique, a list of contents and the like written inside the cosmetic container appears enlarged through a Fresnel lens fitted to the outside cover. Techniques for magnifying the spine label on a box-shaped container are disclosed in British Patent Application No. GB2222143A and U.S. Pat. No. 5,366,073, according to which a cylindrical lens is arranged on one side of a compact disc (CD) case to magnify the part of the spine label facing the lens.

Furthermore, U.S. Pat. No. 5,544,741 discloses a technique by which printed information on a card inserted into a case is made visible through a side of the case. According to this technique, a window is provided on one side of the case, a prism is superposed over a printed card within the case, and information on the printed card is made visible via this prism through the window.

DISCLOSURE OF THE INVENTION

It is an object of the present invention to provide a case having the same shape and dimensions of conventional cases, through one side of which the surface of the object inside, for instance a recording medium, can be seen. It further serves generally to solve the following disadvantages of the prior art:

(1) The label should be designed, printed and fitted to match the object to be kept in the case, which increases costs.
(2) The object contained should always be consistent with the spine label.
(3) If an object is kept in a universal case with no spine label, seeking the object is time-consuming.
(4) Filling out information on the spine label also requires time and menial work.

The invention provides a case for keeping an object, more specifically a case having on one of its sides a transparent member to allow the surface of the object to be seen through the side by refracting the light reflected from the surface of that object.

Generally, the shape of the case may be a rectangular parallelepiped, a polyhedron or a cylinder. In the terminology regarding the structure of the case here, the flat part on which an object, which may be a recording medium for instance, is placed is called the bottom; the lid covering the bottom is called the top; and the parts other than the bottom and the top are called the sides.

The part connecting the top and the bottom is called the hinge.

In the following description, the term "convex lens" refers to not only so-called spherical convex lenses (planoconvex lenses, convex meniscus lenses and spherical lenses) but also aspherical lenses (including cylindrical lenses and ones whose cross section is oval, parabolic, hyperbolic or the like) and Fresnel lenses. It need not be a perfect lens, but rather anything of a shape that has optical effects similar to a convex lens in terms of convergence, refraction and the like is equally applicable.

Likewise, the term "concave lens" refers to not only so-called spherical concave lenses (planoconcave lenses and concave meniscus lenses) but also aspherical lenses (including cylindrical lenses and ones whose cross section is oval, parabolic, hyperbolic or the like), Fresnel lenses, etc. It need not be a perfect lens, but rather anything of a shape that has optical effects similar to a concave lens in terms of divergence, refraction and the like is equally applicable.

Using this terminology, solutions will be enumerated below.

(1) A case for keeping an object comprising a bottom and sides is equipped with an optically transparent member provided on one of its sides, such as a convex or concave lens or a prism, which performs at least one of the functions of converging, diverging, or bending the path of, the light reflected from surface of the object such as a recording medium inside the case and which transmits it outward.

(2) The peripheral part or non-central part of a convex or concave lens, which has a higher refractivity than its central part, is used.

(3) A light-guiding member is provided that comprises any desired combination of lens, prism, mirror, optical fiber or the like, for determining the path of the light transmitted through one or more sides of the case under (1) or (2) above.

(4) A magnifying member is provided, such as a convex lens for magnifying an image formed by one or more sides of the case under (1) or (2) above.

(5) A wide field of view is obtained by providing a screen made of ground glass or smoke glass, a light-scattering translucent screen or the like, on which the light transmitted by the side or sides of the case under (1) or (2) forms an image.

(6) A case holder for keeping a number of cases is provided with a light emitting unit, and light emitted from the light emitting unit is directed into each one of them through one or more of its sides so that the surface of each object inside it can be seen through another of its sides.

Thus, a case according to the invention is a case for keeping therein a planar object on a bottom, comprising a top, a bottom arranged facing the top and at least one side provided at an end part of the top and/or an end part of the bottom, wherein at least one side has a first transparent member causing a bundle of rays to converge, refractivity of the first transparent member gradually increasing in the direction of the top from the bottom, and/or a second transparent member causing the bundle of rays to diverge, refractivity of the second transparent member gradually increasing in the direction of the bottom from the top, so that the surface of the object can be seen through this side. Refractivity means the degree of refraction light undergoes as it passes through the transparent member.

Here, the first transparent member, for example, may have a cross-sectional shape of part of a convex lens, a circle or the like. Or the first transparent member can be curved to the inside, where the object is to be kept, in the direction of the top from the bottom. The second transparent member, for example, may have a cross-sectional shape of part of a concave lens. The first transparent member and/or second transparent member may take the shape of a straight rod, a curved rod or a curved lens-shaped rod. The first transparent member and/or second transparent member may as well have a cylindrical shape.

The side of the case may have a light-guiding member that bends the path of the light transmitted through it, a magnifying member that magnifies the image formed by the light transmitted through it, or a screen member on which the light transmitted through it forms an image.

A case according to the invention is a case for keeping therein a planar object on a bottom, comprising a top, a bottom arranged facing the top and at least one side provided at an end part of the top and/or an end part of the bottom, wherein at least one side may have a prism, the prism base is arranged in the direction of the bottom, so that the surface of the object can be seen through this side. The prism base means the part facing the prism apex formed between a pair of light refracting edge lines. This prism may be a right-angled prism. Further, the prism may take the shape of a straight rod, a curved rod or a curved lens-shaped rod. Furthermore, the prism may have a cylindrical shape. The first transparent member and/or second transparent member or the prism may have the additional function of a concave lens facing the object placed in it.

Furthermore, a case holder according to the invention for keeping the aforementioned cases, comprises a light emitting unit so arranged as to emit light into each of the cases through one of its sides. In the path of the light emitted from the light emitting unit, a transparent member may be provided to condense or scatter the light.

BEST MODES FOR CARRYING OUT THE INVENTION

Figure 1:
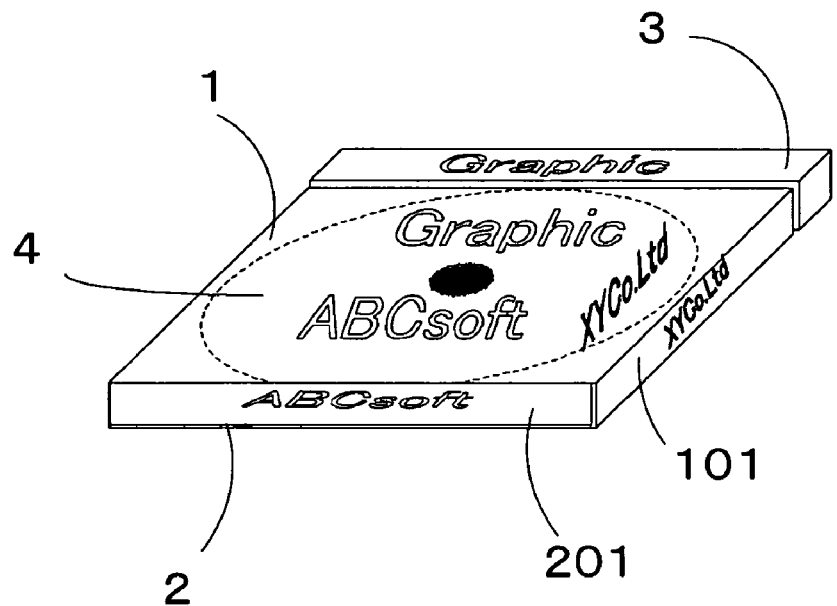
FIG. 1 shows an external view of a case, which is an embodiment of the present invention.

FIG. 1 shows an external view of a case, which is an embodiment of the present invention. For this embodiment, an example in which a CD-ROM 4 is kept in a transparent plastic case is shown. The invention can be applied in exactly the same way to any instance in which a planar object, such as a compact disc (CD), is kept in place of a CD-ROM. This case is provided with a top 1, a bottom 2 for keeping a recording medium, and a hinge 3 for connecting the top 1 and the bottom 2. In the following description, to distinguish it from the front, the hinge fitted with a back surface will be referred to as the back hinge 3.

This case has four sides including the front 201, the two flanks 101, right and left, and the back (invisible in this drawing) positioned between the bottom 2 and the back hinge 3. This drawing illustrates a state in which the printed surface of the CD-ROM 4 that is kept within, bearing characters, graphics and so forth (hereinafter referred to as the CD-ROM's printed surface) is partially visible from the respective sides.

Figure 2:
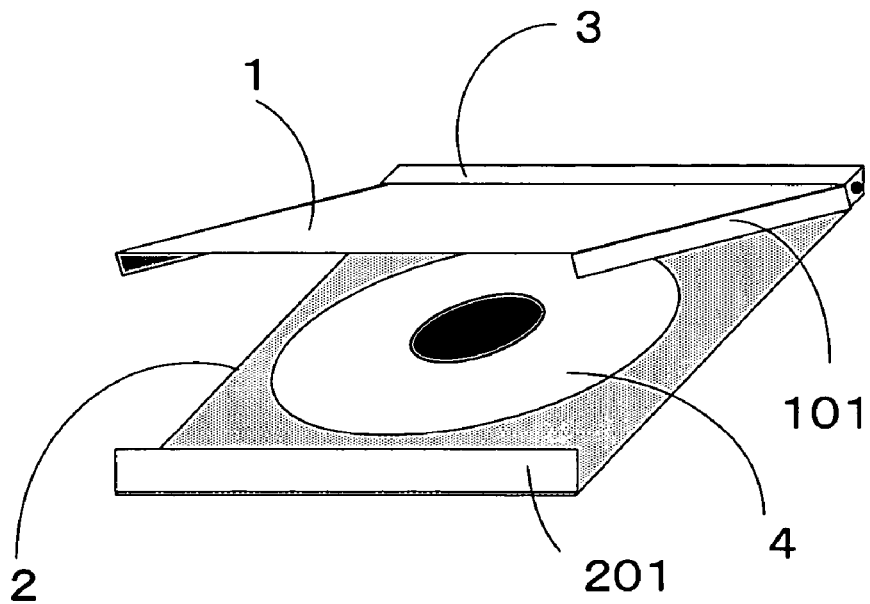
FIG. 2 shows an external view of the case with its top open.

FIG. 2 shows an external view of the case with the top 1 open. In this example, the flanks 101 are joined to the top 1 while the front 201 is joined to the bottom 2. The joining of the flanks need not be the same as in this example, and each flank may be joined to either the top 1 or the bottom 2.

Figure 3:
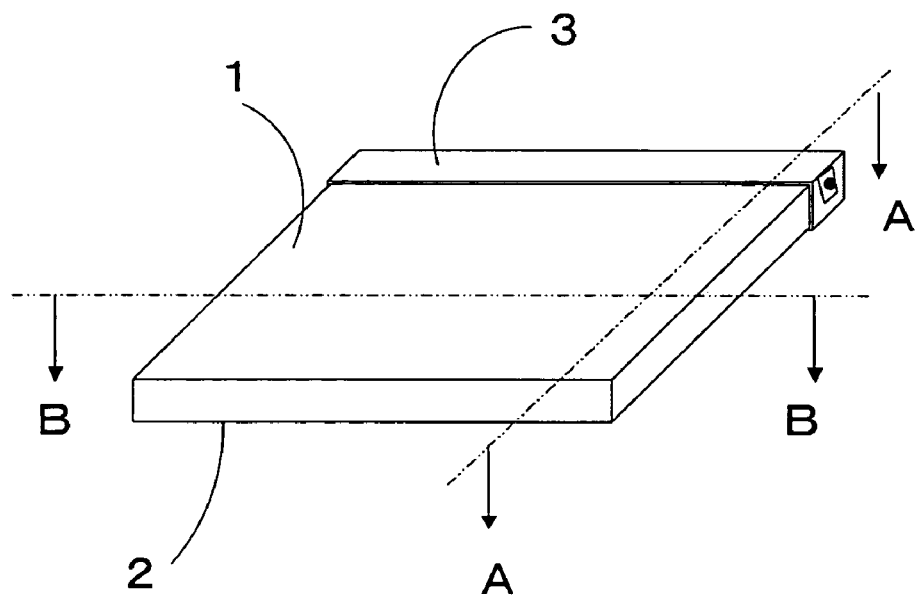
FIG. 3 shows an external view of the case with chain lines drawn to indicate the location of cross sections.

FIG. 3 shows an external view of the case with broken lines drawn to facilitate description of the cross-sectional views that will follow. Cross sections in two directions, A—A and B—B, are chosen.

Figure 4:
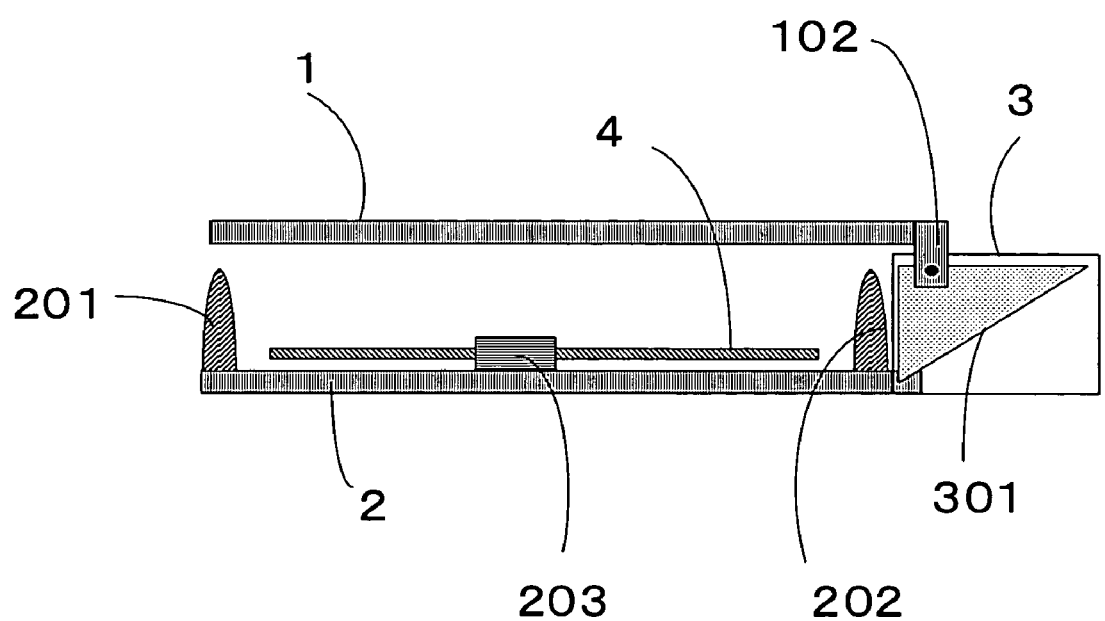
FIG. 4 shows a cross-sectional view in the A—A direction of FIG. 3.

FIG. 4 shows a cross-sectional view cut in the A—A direction of FIG. 3. Reference number 102 denotes a case stopper for connecting the top 1 and the bottom 2; 202, the back positioned on the reverse; 203, a CD-ROM stopper to fit into the center hole of a recording medium such as a CD-ROM; and 301, a light-guiding member, comprising a prism in this example, for controlling the direction of the light coming via the back 202. Generally, the light guiding member 301 can be realized by any appropriate combination of lens, prism, mirror, optical fiber or the like.

Figure 5:
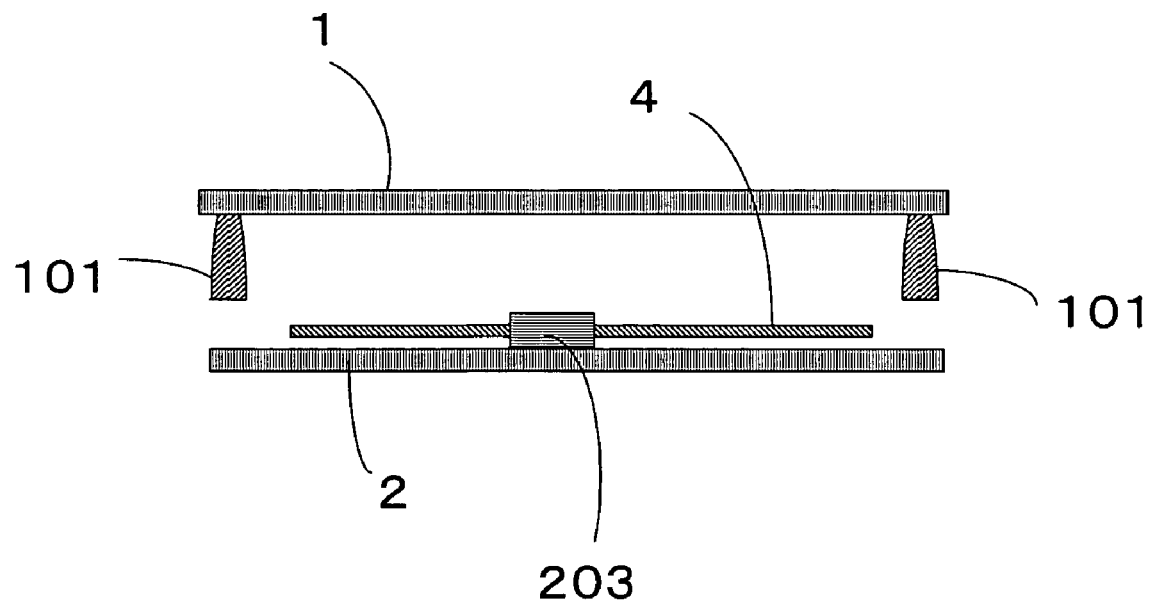
FIG. 5 shows a cross-sectional view in the B—B direction of FIG. 3.

FIG. 5 shows a cross-sectional view cut in the B—B direction of FIG. 3. The flanks 101 are joined to the right and left edges of the top 1.

Figure 6:
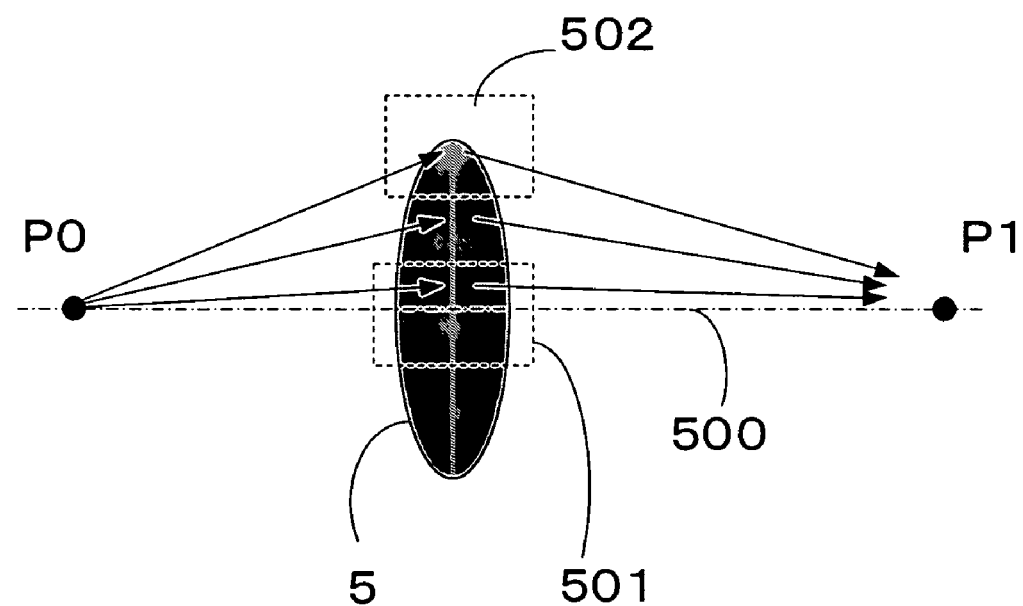
FIG. 6 illustrates the general principle of the action of a convex lens.

FIG. 6 illustrates the general principle of the action of a convex lens. Reference number 5 denotes a convex lens; 500, an optical axis; 501, the central part of the convex lens; and 502, the peripheral part of the convex lens.

When the lighting source P0 is positioned outside the focal distance, the divergent light emitted from P0 is refracted as shown by the arrows in the drawing, and converges and forms an image at P1. The location of P1 is determined by the refractive index, the focal distance of the convex lens 5, and the position of P0.

It should be noted that the light going through the peripheral part 502 of the convex lens is refracted more than the light going through the central part 501 of the convex lens, so that the light is bent inward and converges.

To be more exact, in a convex lens, the degree of refraction (refractivity or dioptric power) of transmitted light increases in the direction of the end part of the convex lens from the center. However, at the same time, the visible range is reduced and the image becomes clearer. To add, a similar phenomenon to this is observed with other convex lenses as well.

The present invention makes use of this phenomenon.

As a common function of convex lenses, when the object is outside the focal distance, it is widely known that a magnified image is generally obtained by the convergence of light. When the object is inside the focal distance, it is further known that the light from the object is diverged by the convex lens.

Figure 7:
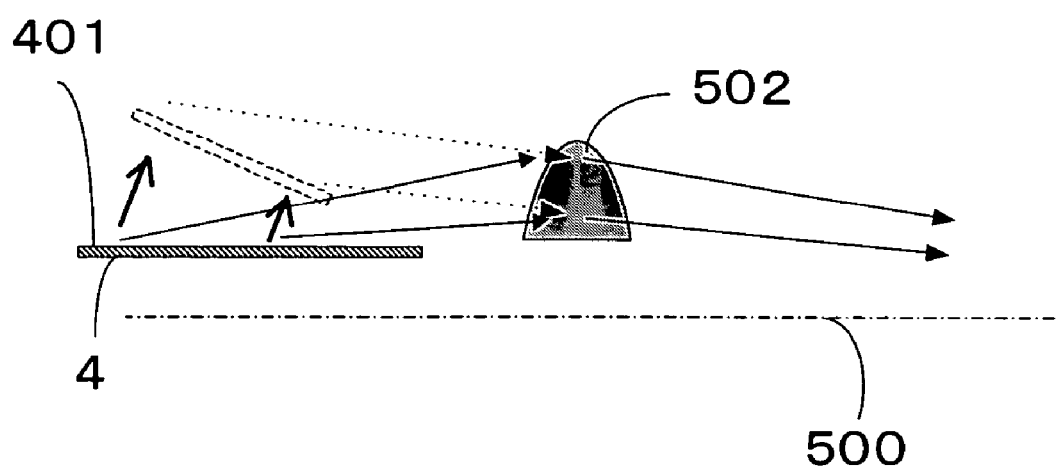
FIG. 7 illustrates the principle at work when the printed surface of a CD-ROM is arranged at right angles to the peripheral part of a convex lens.

FIG. 7 illustrates the principle at work when the CD-ROM's printed surface 401 is arranged at right angles to the peripheral part 502 of the convex lens, which is cut away for illustration. Part of the light reflected from the CD-ROM's printed surface 401 strikes at an angle the peripheral part 502 of the convex lens. The incident light, as described with reference to FIG. 6, is greatly refracted such that it converges onto the right side of the field of view.

Thus, as the refractivity increases toward the upper part of the peripheral part 502 of the convex lens, the more distant part of the CD-ROM's printed surface 401 appears to rise and float above the actual disc face, as indicated by the broken line in the drawing, and looks as if it is inclined toward the bottom right in the diagram.

Figure 8:
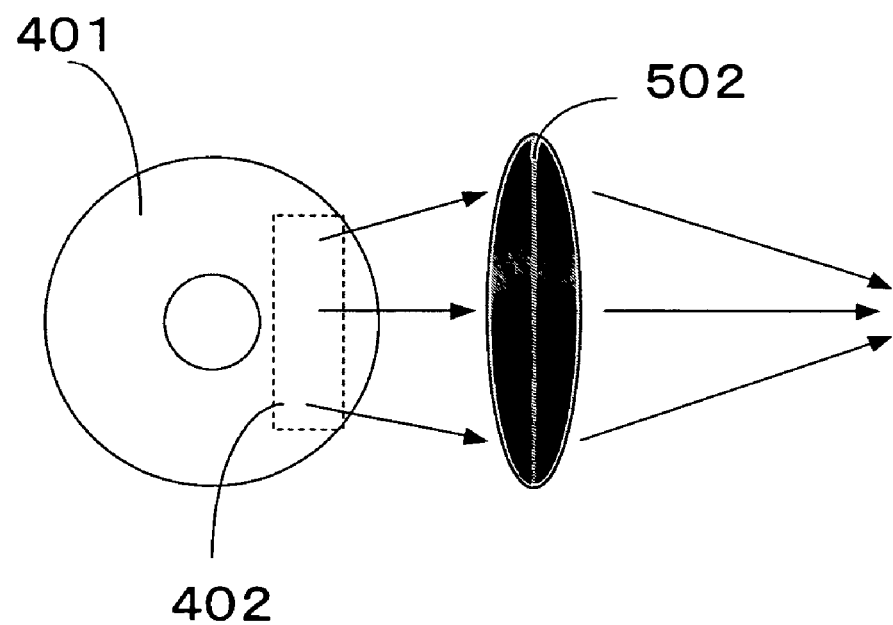
FIG. 8 illustrates the principle at work when the arrangement shown in FIG. 7 is viewed from above.

FIG. 8 illustrates this principle when the arrangement shown in FIG. 7 is viewed from above. Here is shown an instance in which light reflected from the visible area 402 of the CD-ROM's printed surface 401 is transmitted by the peripheral part 502 of the convex lens, refracted such that it converges, and enters into the field of view.

The range of the visible area 402 is determined by the distance between the printed surface 401 of the CD-ROM, which is the recording medium, and the peripheral part 502 of the convex lens, the refractive index, and the focal distance of the peripheral part 502 of the convex lens, among other factors.

Although the description referring to FIG. 7 and FIG. 8 pertains to the peripheral part 502 of the convex lens as an example, the usable part of the convex lens 5 is not limited to the peripheral part 502 of the convex lens, but any appropriate part of the convex lens 5 may be selected for the purpose depending on the size and, more importantly, the material of the case, the height of its sides, the distance between the recording medium and the sides, and the dimensions of the required visible area, among other factors.

However, as the case of a recording medium, such as a CD-ROM, is usually rather thin, obviously it is more effective to use a part as close as possible to the peripheral part of the convex lens 5 in order for its printed surface to be visible at right angles to it.

Figure 9:
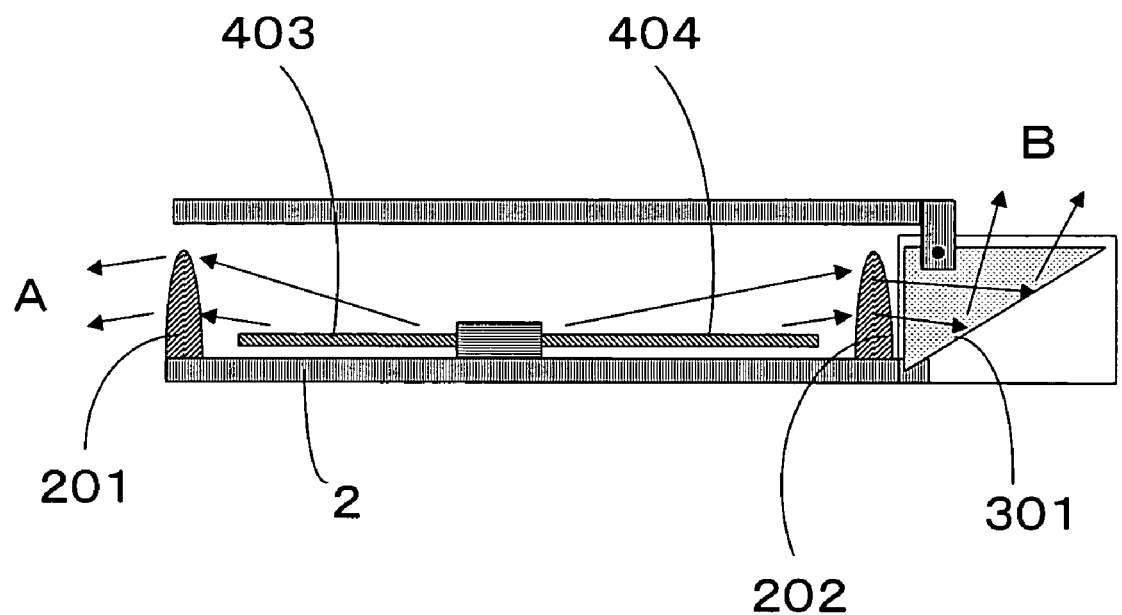
FIG. 9 shows a cross-sectional view with the reflection paths of light added to FIG. 4.

FIG. 9 shows a cross-sectional view with the reflection paths of light added to FIG. 4.

Here, members in the shape of the peripheral part 502 of a convex lens are fitted, with their flat face down, at the front 201 and the back 202 to the bottom 2. Thus, these sides are shaped like the peripheral part 502 of a convex lens which causes the bundle of rays to converge, gradually increasing in refractivity in the direction of the top 1 from the bottom 2, so that the CD-ROM's printed surface can be seen through them.

The light reflected from the CD-ROM's printed surface A403 and the light reflected from the CD-ROM's printed surface B404 reach the front 201 and the back 202, each fitted with the peripheral part 502 of a convex lens. The light transmitted through the front 201 goes straight into a field of view A. The light transmitted through the back 202 reaches the light-guiding member 301 which is composed of a prism, and is totally reflected by the slanted surface, to enter into the field of view B in the upward direction as shown.

Figure 10:
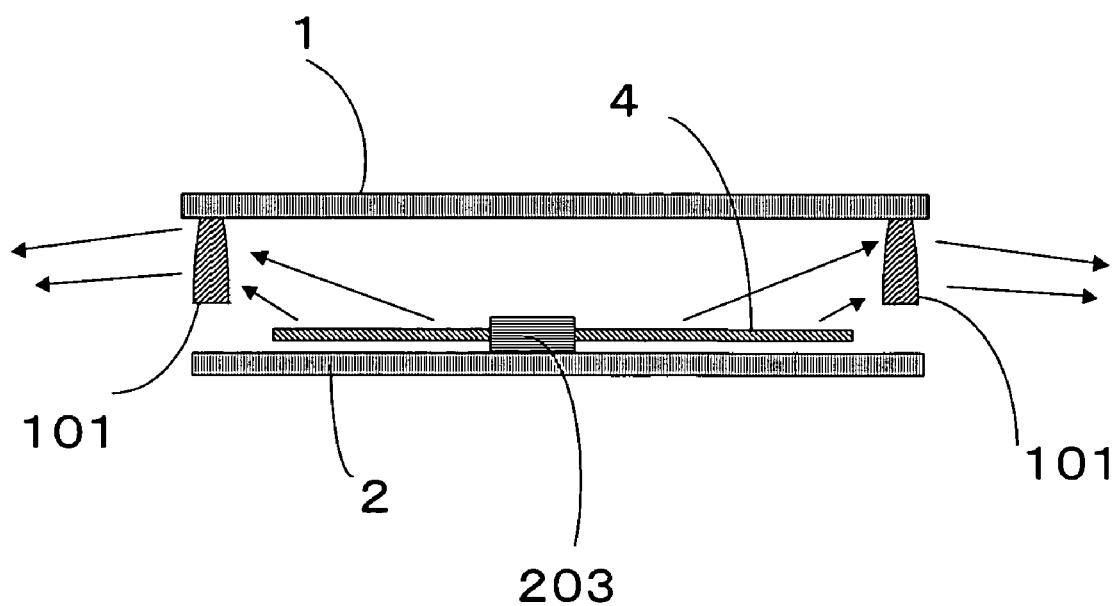
FIG. 10 shows a cross-sectional view with the reflection paths of light added to FIG. 5.

FIG. 10 shows a cross-sectional view with the reflection paths of light added to FIG. 5.

Here, members in the shape of the convex lens peripheral part 502, with their flat face down, are fitted to the top 1 to form the flanks 101. In this example, too, these sides are shaped like the peripheral part 502 of a convex lens which causes the bundle of rays to converge, gradually increasing in refractivity in the direction of the top 1 from the bottom 2, so that the CD-ROM's printed surface can be seen through them.

As in the instance of FIG. 9, the light reflected from the CD-ROM's printed surface reaches both flanks 101, and the light transmitted through them goes straight into the fields of view on both sides. Where the flanks 101 are fitted to the bottom 2 instead of the top 1, a similar effect can be obtained by fitting to the bottom 2 members in the shape of the peripheral part 502 of a convex lens, with their flat face down, to maintain the desired direction.

Figure 11:
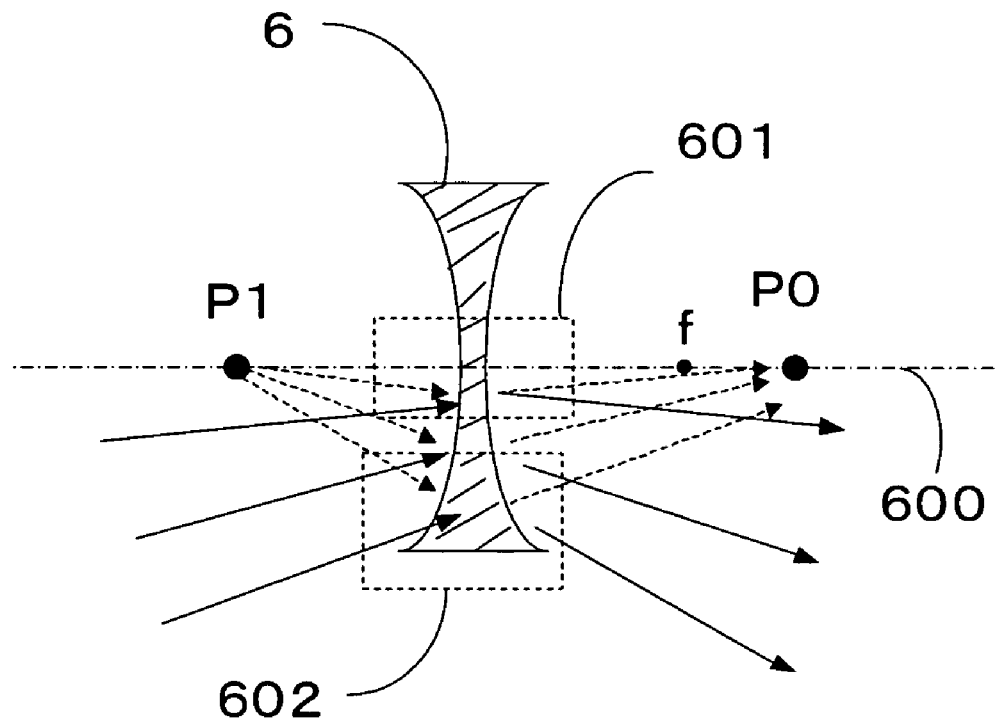
FIG. 11 illustrates the general principle of the action of a concave lens.

FIG. 11 illustrates the general principle of the action of a concave lens. Reference number 6 denotes a concave lens; 600, its optical axis; 601, the central part of the concave lens; and 602, the peripheral part of the concave lens.

When converging light rays, indicated by solid lines in the diagram, advance through the concave lens toward a single point P0 that is outside its focal point f, they are refracted and diverge. As a result, a virtual image is formed that looks as if emitted from P1, as indicated by dotted lines in the drawing. The eventual paths of light will be as indicated by the solid lines. The location of P1 is determined by the refractive index, the focal distance of the concave lens 6, and the position of P0.

It should be noted that, as with the convex lens 5, the light transmitted through the peripheral part 602 of the concave lens is more greatly refracted than the light transmitted through the central part 601 of the concave lens, so that the paths of the light are bent outward and diverge.

To be more exact, the degree of refraction (refractivity or dioptric power) of transmitted light increases in the direction of the end part of the concave lens from the center. However, at the same time, the visible range is reduced and the image becomes clearer, as is the case with the convex lens 5. To add, a similar phenomenon to this is observed with other concave lenses as well.

The present invention makes use of this phenomenon.

As a common function of concave lenses, it is widely known that a wide-angle image is generally obtained, though contracted by divergence, depending at the same time on positional relationships with the focal point and other factors.

Figure 12:
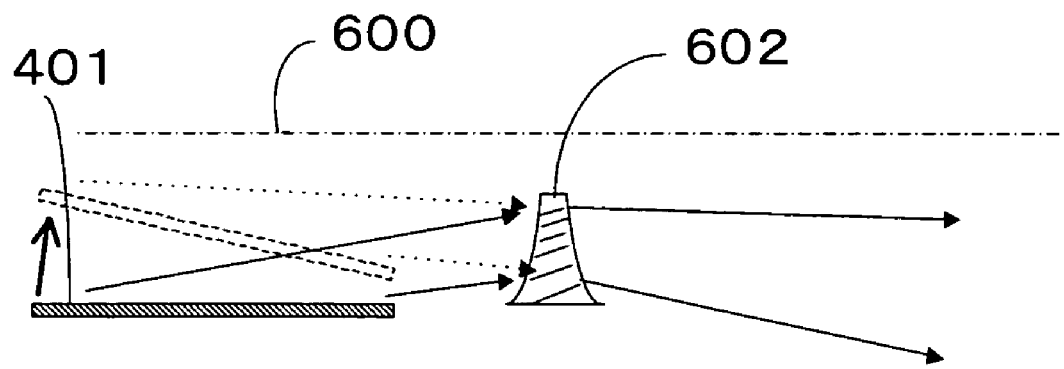
FIG. 12 illustrates the principle at work when the printed surface of a CD-ROM is arranged at right angles to the peripheral part of a concave lens.

FIG. 12 illustrates the principle at work when the CD-ROM's printed surface 401 is arranged at right angles to the peripheral part 602 of the concave lens (cut away). Part of the light reflected from the CD-ROM's printed surface 401 strikes at an angle the peripheral part 602 of the concave lens. The incident light, as was described with reference to FIG. 11, is refracted such a way that it diverges and enters the field of view on the righthand side.

Thus, as the refractivity increases toward the bottom part of the peripheral part 602 of the concave lens, the CD-ROM's printed surface 401 appears to rise and float above the actual disc face, as indicated by the broken line in the drawing, and the large part of the CD-ROM's printed surface 401, from deep inside toward the viewer, looks as if it is inclined toward the bottom right in the diagram.

Although the foregoing description pertains to the peripheral part 602 of the concave lens as an example, the usable part of the concave lens 6 is not limited to the peripheral part 602 of the concave lens as is the case with the peripheral part 502 of the convex lens, but any appropriate part of the concave lens 6 may be selected for the purpose depending on the size and, more importantly, the material of the case, the height of its sides, the distance between the recording medium and the sides, and the dimensions of the required visible area among other factors.

However, as the case of a recording medium, such as a CD-ROM, is usually rather thin, obviously it is more effective to use the area as close as possible to the peripheral part of the concave lens 6 in order for its printed surface to be visible at right angles to it.

Figure 13:
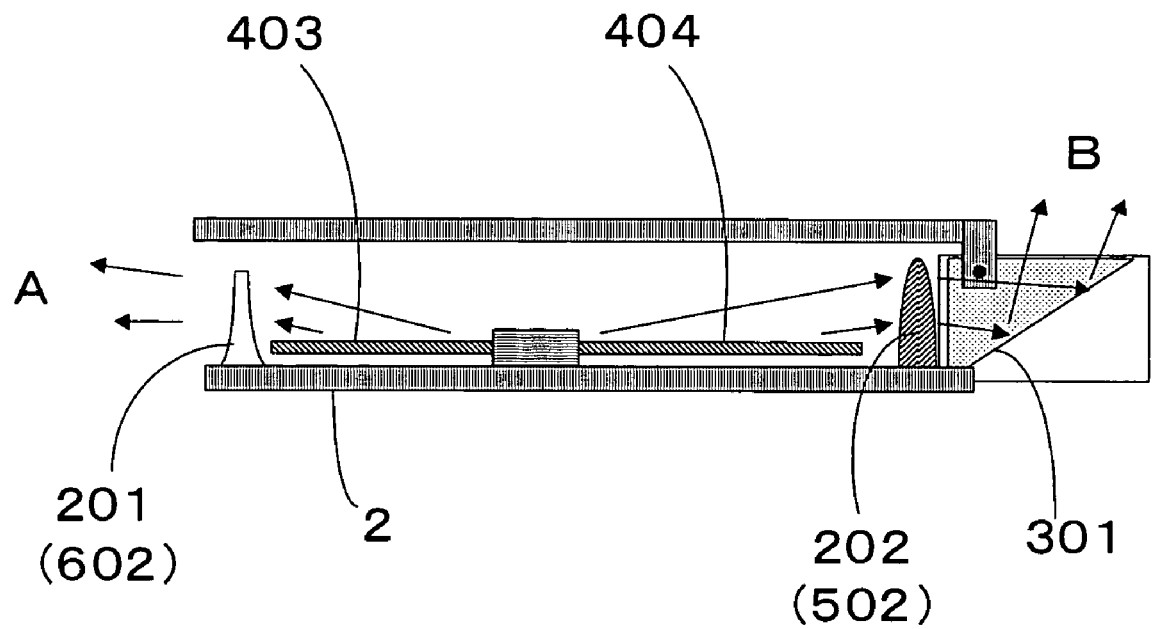
FIG. 13 shows across-sectional view with the reflection paths of light added as in FIG. 9.

FIG. 13 shows a cross-sectional view with the reflection paths of light illustrated as in FIG. 9.

The difference from FIG. 9 is that, in the position of the front 201, a member shaped like the peripheral part 602 of the concave lens, instead of the peripheral part 502 of the convex lens, fitted to the bottom 2 with its wide base directed downwards. Thus this side is shaped like the peripheral part 602 of the concave lens which causes the bundle of rays to diverge, gradually increasing in refractivity in the direction of the bottom 2 from the top 1, so that the CD-ROM's printed surface can be seen through it.

The light reflected from the CD-ROM's printed surface A403 reaches the front 201 at left. The light transmitted through the front 201 goes straight into the field of view A.

Here, unlike the magnified image provided by the peripheral part 502 of the convex lens, a wide-angle contracted image is usually obtained.

Further, the peripheral part 602 of the concave lens can be similarly applied to other sides, i.e., the flanks 101 and the back 202.

Figure 23:
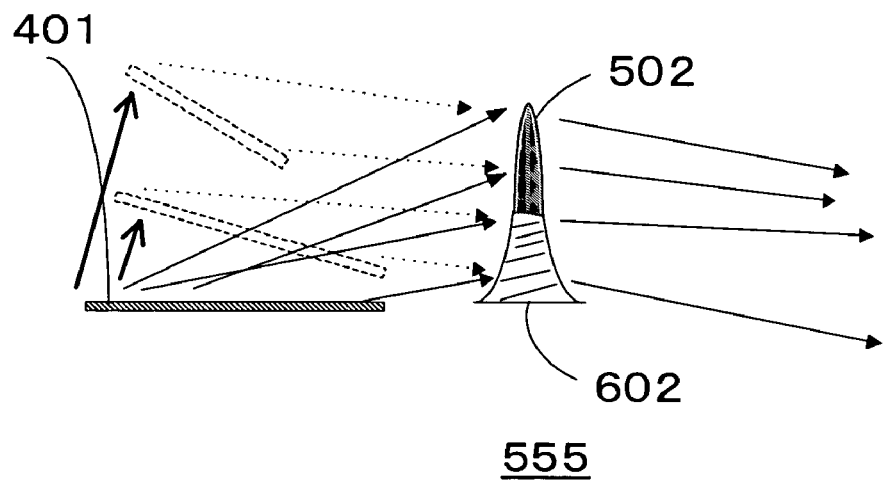
FIG. 23 shows a multiple-element transparent member formed by stacking the peripheral part of a convex lens on top of the peripheral part of a concave lens.

FIG. 23 shows a multiple-element transparent member 555 composed of the peripheral part of a convex lens, as shown in FIG. 7, and a concave peripheral member, as shown in FIG. 12, stacked on top of it. This embodiment will generally provide a wider field of view as the CD-ROM printed face 401 is caused by the convex lens end part 502 to look as if rising and inclined rightwards in the deep part close to the center of the printed face 401 and by the concave lens end part 602 to look as if inclined towards the bottom right wholly from deep inside towards the viewer.

Figure 24:
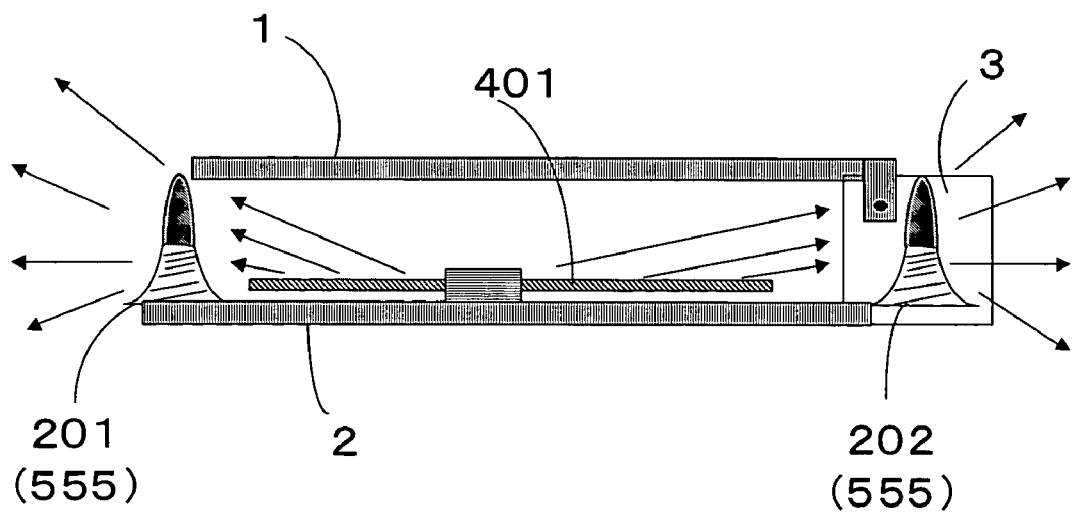
FIG. 24 shows an external view of a case according to still another embodiment of the invention.

FIG. 24 shows an external view of a case according to another embodiment of the invention. This embodiment uses a multiple-element transparent member shown in FIG. 23. On the front 201 and the back 202, multiple-element transparent members 555 are fitted to the bottom 2. Thus each side in this instance has the peripheral part of a convex lens, which causes the bundle of rays to converge, gradually increasing in refractivity in the direction of the top 1 from the bottom 2, and the peripheral part of a concave lens, which causes the bundle of rays to diverge, gradually increasing in refractivity in the direction of the bottom 2 from the top 1, so that the CD-ROM'sprinted surface 401 can be seen through it.

Figure 14:
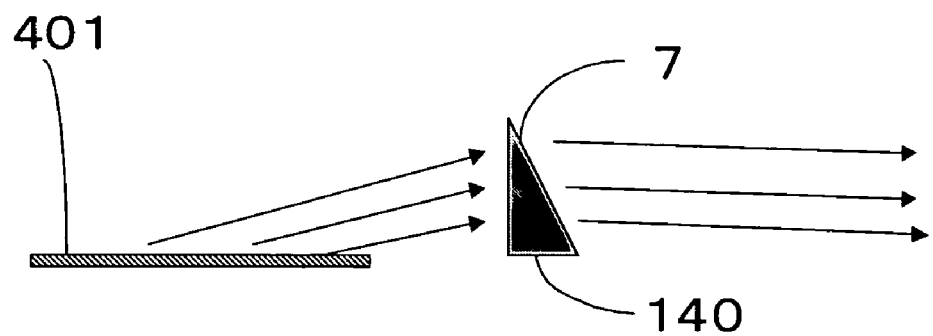
FIG. 14 illustrates the principle at work when the printed surface of a CD-ROM is arranged at right angles to a right-angled prism.

FIG. 14 illustrates the principle at work when the CD-ROM printed face 401 is arranged at right angles to a right-angle prism 7 which, unlike the lenses described so far, has one right-angle corner.

In particular, the right-angled prism base 140 of the right-angle prism 7 is directed down towards the CD-ROM printed face 401, and part of the light reflected by the CD-ROM printed face 401 obliquely comes incident on a vertical edge of the right-angle prism 7. The prism base 140 corresponds to the part facing the prism apex formed between light refracting edge lines. The incident light changes its traveling direction as it is refracted twice within the right-angle prism 7, and enters into the field of view on the righthand side.

Although the foregoing description pertains to the right-angled prism 7 as an example, the usable prism is not limited to the right-angled prism 7, but a prism of any appropriate angle may be selected for the purpose depending on the size and, more importantly, the material of the case, the height of its sides, the distance between the recording medium and the sides, and the dimensions of the required visible area among other factors.

However, as the case of a recording medium, such as a CD-ROM, is usually rather thin, obviously it is more effective to use the right-angled prism 7 in the illustrated arrangement in order for the printed surface to be visible at right angles to it, and this arrangement provides a greater visible area than with a non-right-angled prism.

Figure 15:
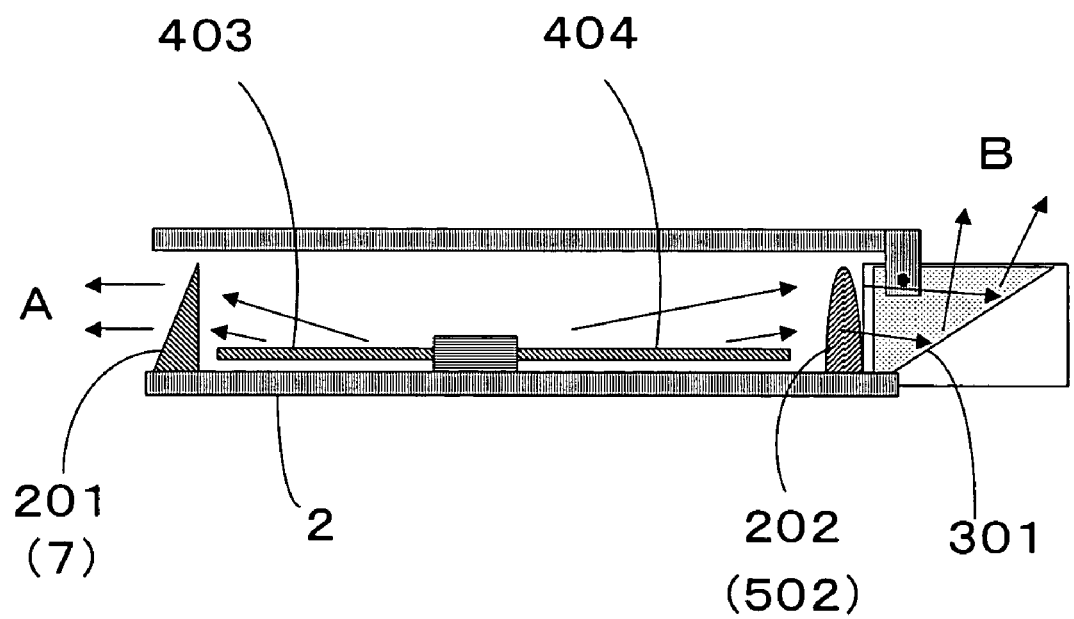
FIG. 15 shows across-sectional view with the reflection paths of light added as in FIG. 9 and FIG. 13.

FIG. 15 shows across-sectional view with the reflection paths of light added as in FIG. 9 or FIG. 13.

The difference between the configurations in FIG. 9 and FIG. 13 is that at the front 201, the right-angle part of the right-angle prism 7 is arranged downwards and directed towards the CD-ROM printed face A403. The prism base of the prism 7 is arranged on the bottom of the case.

The light reflected from the CD-ROM's printed surface A403 reaches the front 201, which is composed of the right-angled prism 7. The light transmitted through the front 201 goes straight into the field of view A.

Here, unlike with the lenses described earlier, the image is only changed through two stages of refraction, but is available in substantially the same size.

Incidentally, the right-angled prism 7 can be similarly applied to other sides, i.e., the flanks 101 and the back 202.

Herein, the right-angle prism 7, the concave lens end part 602 and the convex lens end part 502 can be fitted in combination to the four sides including the flank sides 101, the front side 201 and the back side 202, or at least one of them. It has to be noted that it is more effective to have more than one side fitted with the right-angled prism 7, the peripheral part 602 of the concave lens, or the peripheral part 502 of the convex lens in combination, because this allows more light to enter the case.

Figure 16:
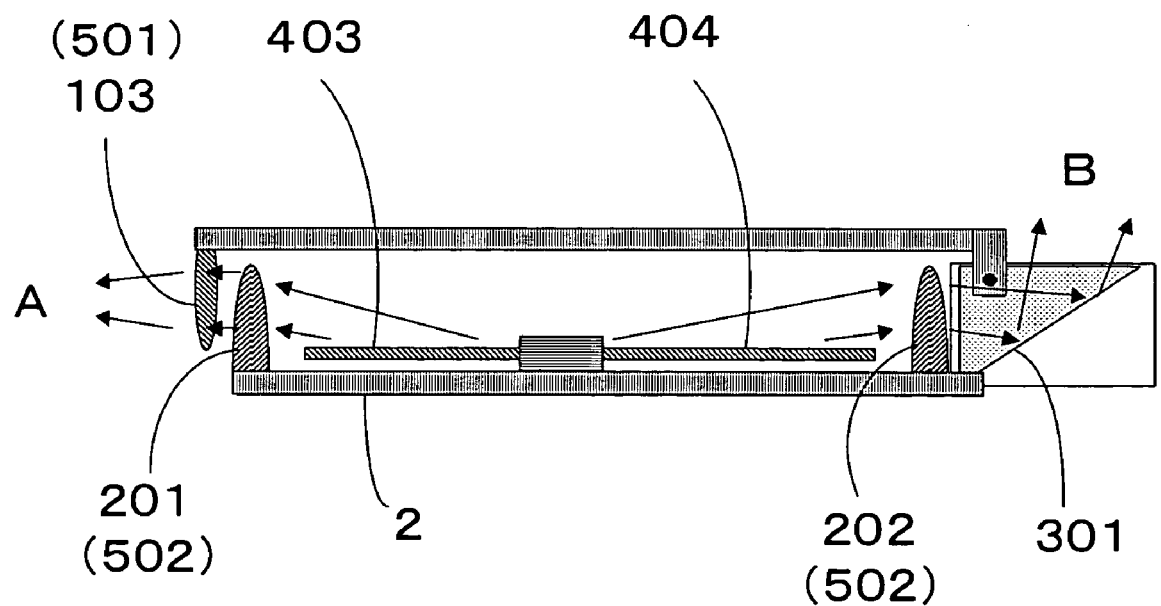
FIG. 16 shows a cross-sectional view of the reflection paths of light where a magnifying member is fitted to the left of the front.

FIG. 16 shows a cross-sectional view of the reflection paths of light where a magnifying member 103 is fitted to the left of the front 201 in the configuration illustrated in FIG. 9, FIG. 13 and FIG. 15.

The magnifying member 103 comprising a part equivalent to the central part 501 of the convex lens is fitted merely for magnifying purposes. In this way, the image appearing after the front 201 is further magnified before entering the field of view A.

As an alternative to the magnifying member 103, it is also possible to use the central part 601 of the concave lens or the like depending on the member used for the front 201 and the distance between the two.

Also, the magnifying member 103 can be similarly applied to other sides, i.e., the flanks 101 and the back 202.

Figure 17:
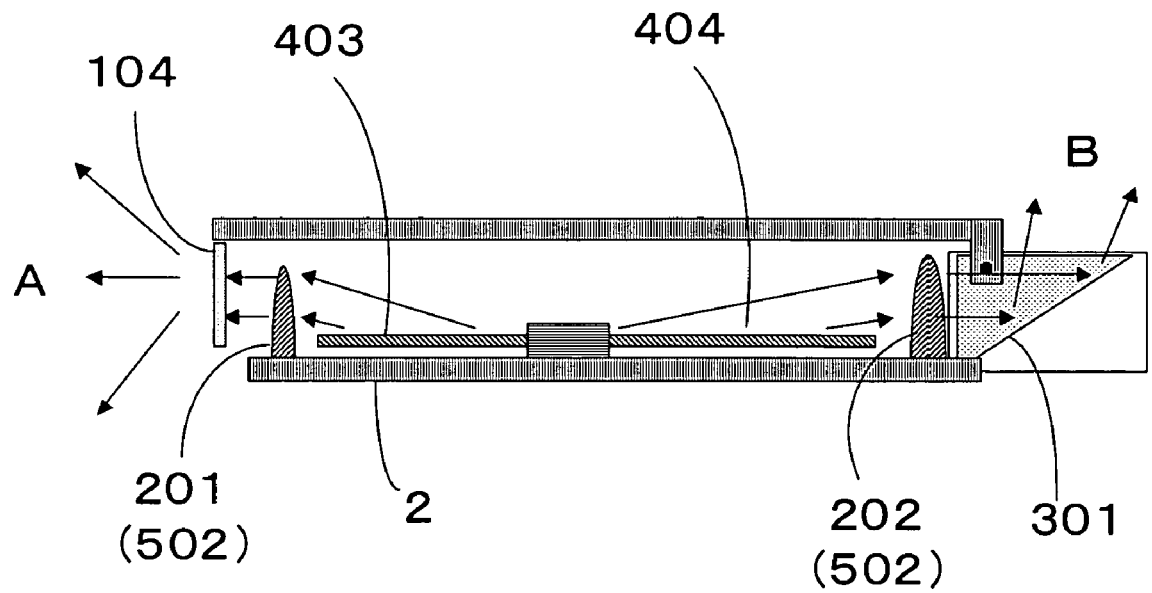
FIG. 17 shows a cross-sectional view of the reflection paths of light where a screen member is fitted to the left of the front.

FIG. 17 shows a cross-sectional view of the reflection paths of light where a screen member 104 is fitted to the left of the front 201 in the configuration illustrated in FIG. 9, FIG. 13 and FIG. 15.

The screen member 104 is provided so that an image can be formed on it from the light transmitted through the front 201. As a result, the contents can be viewed from a wider angle.

Also, the screen member 104 can be similarly applied to other sides, i.e., the flanks 101 and the back 202.

It can also be used in combination with the magnifying member 103.

Figure 25:
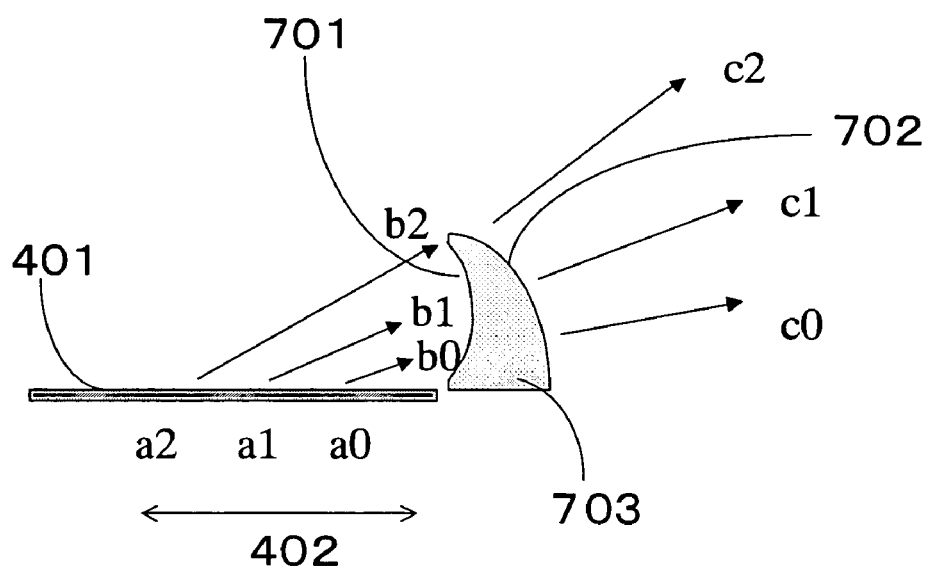
FIG. 25 shows an example of a circularly arced transparent member as the transparent member.

FIG. 25 shows an example of an arced transparent member 703 having a sectional shape of part of a circle, being used as a general transparent member. It is formed so that the section of an outer contour 702 constitutes part of a circle. The rays of light reflected from the CD-ROM's printed surface 401 take a variety of paths such as a0→b0→c0, . . . , and a2→b2→c2, thus providing a wide angle of view. By making the inner contour 701 of the arced transparent member 703 concave, a large visible area 402 can be secured on the CD-ROM's printed surface 401, and by making the outer contour 702 arced, the text and images in the visible area 402 can be magnified. It has to be noted, however, that the shape of the inner contour 701 is not limited to a concave, but may equally well be linear.

Figure 26:
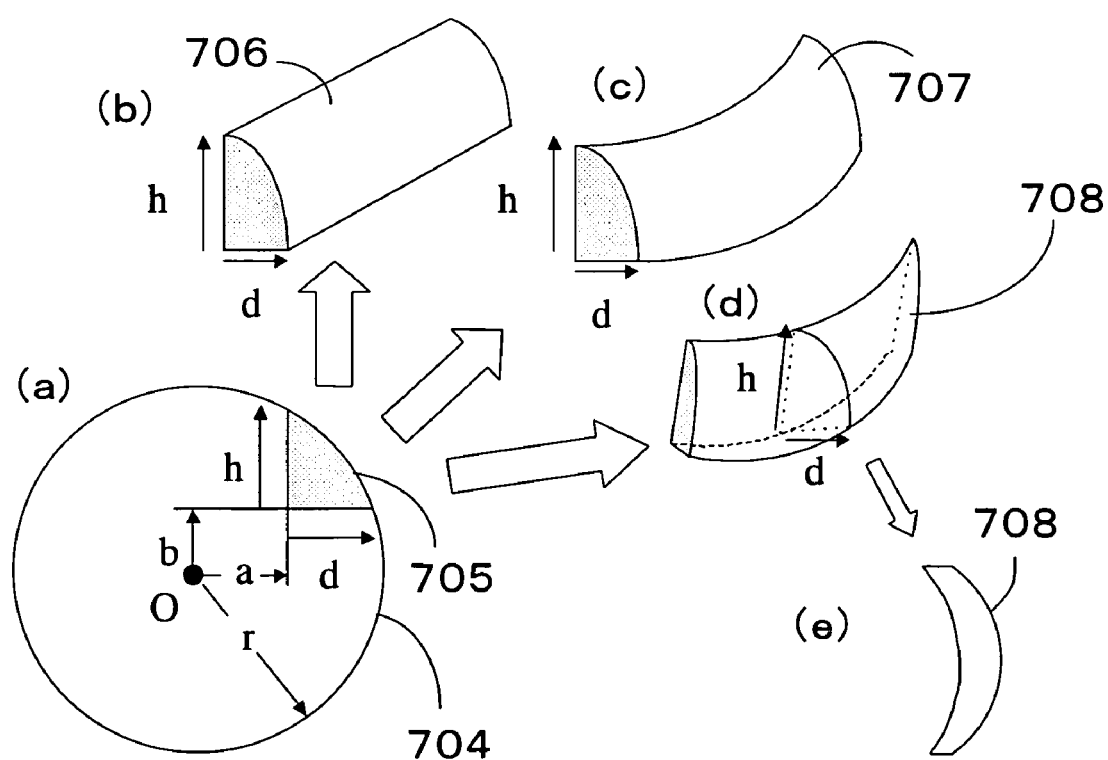
FIGS. 26(a) through 26(e) show examples of method to cut out a transparent member and its external view.

FIGS. 26(a) through 26(e) show examples of method to cut out a transparent member and the resulting external views. As shown in FIG. 26(a), the cross section of any transparent member is a part of a circle 704 having a radius r, more specifically, an arc 705 of a height h and a width d with displacements a and b in x and y directions from the center O. The value of the height h is determined by the height of the case, and the displacements a and b and the width d, on the basis of a visible area and a required angle of viewing from outside. Examples of the applicable shapes of the transparent member include a straight rod 706 formed to have a section of the arc 705 shown in FIG. 26(b), a curved rod 707 shown in FIG. 26(c), and a curved lens-shaped rod 708 shown in FIG. 26(d). The transparent member 708 formed in a curved lens-shaped rod has the arc 705 whose central part has a height h and a width d, gradually tapered toward both ends as shown in the plan view of FIG. 26(e). In particular the use of the curved transparent member 707 and the curved lens-shaped rod transparent member 708 would serve as not only a vertical, but also a lateral magnifier. Although the arc 705 is used in this example, the cross-sectional shape is not limited to this, but there also are other applicable cross-sectional shapes. As transparent members for use on other sides, the straight type 706, the curved type 707 and the curved lens type 708 shown in FIG. 26 are also applicable.

Figure 27:
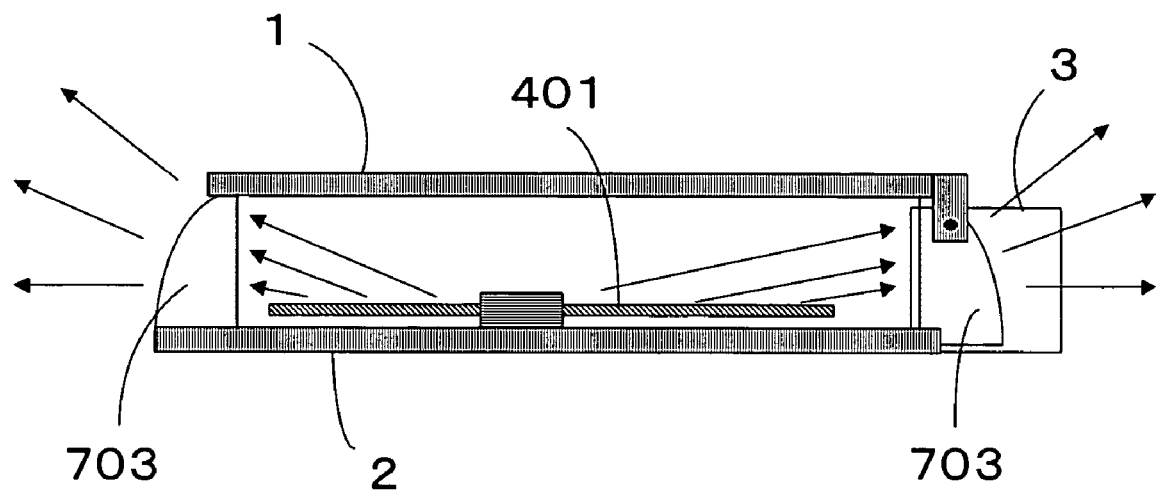
FIG. 27 shows a case according to still another embodiment of the invention.

FIG. 27 shows a case according to still another embodiment of the invention. In the position of a back 3, an arced transparent member 703 is used which has a straight inner contour (as opposed to a curved inner contour 701 shown in FIG. 25). This embodiment provides a large visible area 402 on the CD-ROM's printed surface 401, and can magnify the resultant image and provide a wide angle of viewing to the outside. Further in terms of external shape, the straight type 706, the curved type 707 and the curved lens type 708 shown in FIG. 26 are also applicable.

Figure 28:
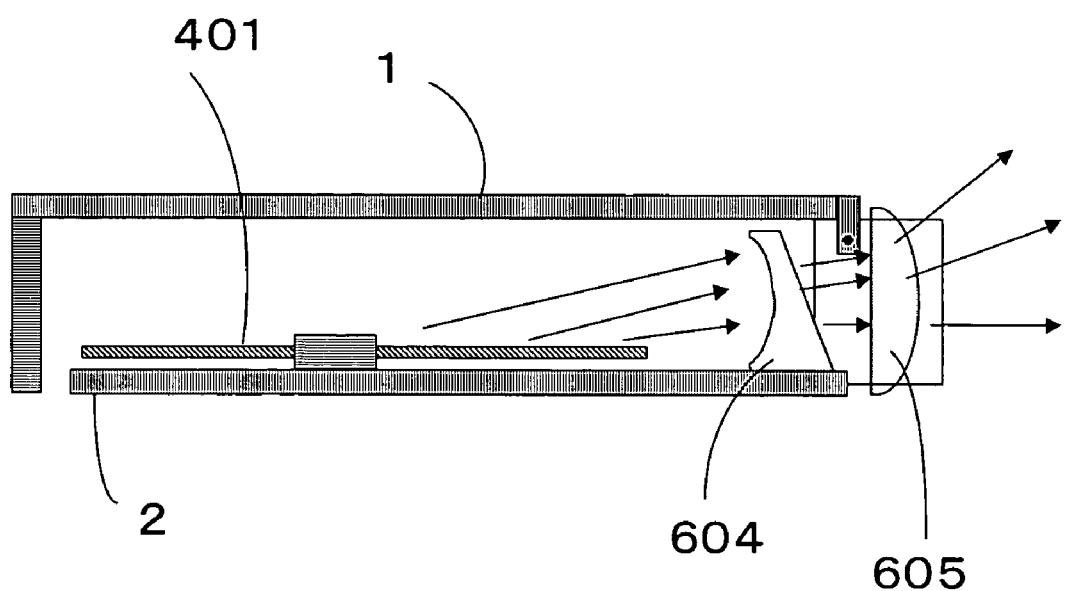
FIG. 28 shows a case according to still another embodiment of the invention.

FIG. 28 shows a case according to a further embodiment of the invention. In the position of the back 3, a concave triangular transparent member 604 is used which combines a concave lens and a triangular prism. A convex lens 605 is arranged behind it. The concave part of the concave triangular transparent member 604 provides a large visible area 402 by capturing the CD-ROM's printed surface 401 in a wider angle. The triangular prism bends the path of the light reflected from the printed surface 401 and redirects it to the convex lens 605 behind, which magnifies the resultant image to provide a wide angle of viewing to the outside. Further in terms of external shape, the straight type 706, the curved type 707 and the curved lens type 708 shown in FIG. 26 are also applicable.

Figure 29:
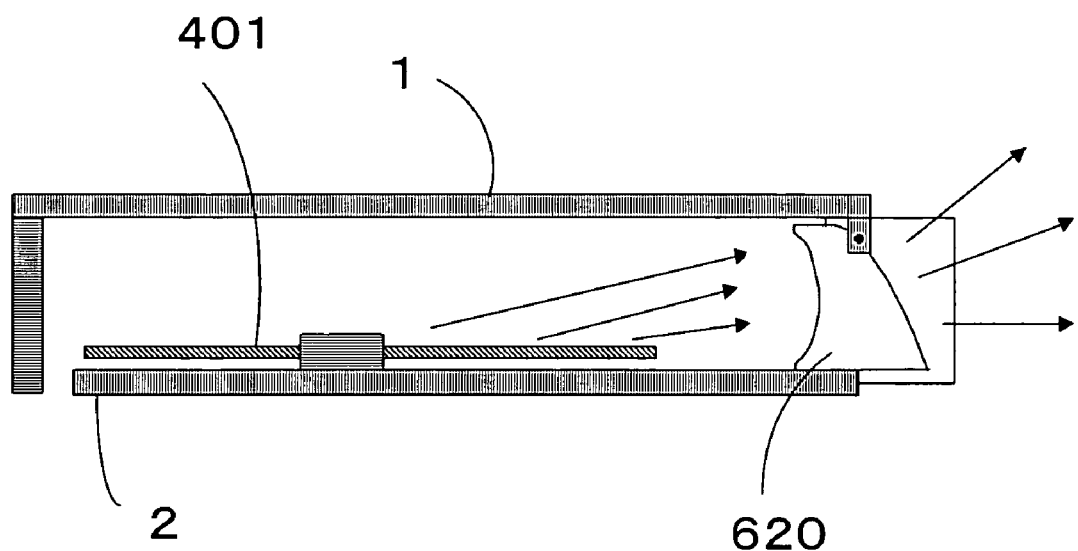
FIG. 29 shows a case according to still another embodiment of the invention.

FIG. 29 shows a case according to a still further embodiment of the invention. In the position of the back 3, a concave arc transparent member 620 is used which combines a concave lens as the inner contour and an arc as the outer contour. The concave part of the concave arced transparent member 620 provides a large visible area 402 by capturing the CD-ROM's printed surface 401 in a wider angle. The arced outer contour bends the path of the light reflected from the printed surface 401 and at the same time magnifies the resultant image to provide a wide angle of viewing to the outside. Here in the outer contour 702 of the arc, a variety of conventional curves such as a parabola or an oval may be used in place of a circle. Further in terms of external shape, the straight type 706, the curved type 707 and the curved lens type 708 shown in FIG. 26 are also applicable.

Figure 30:
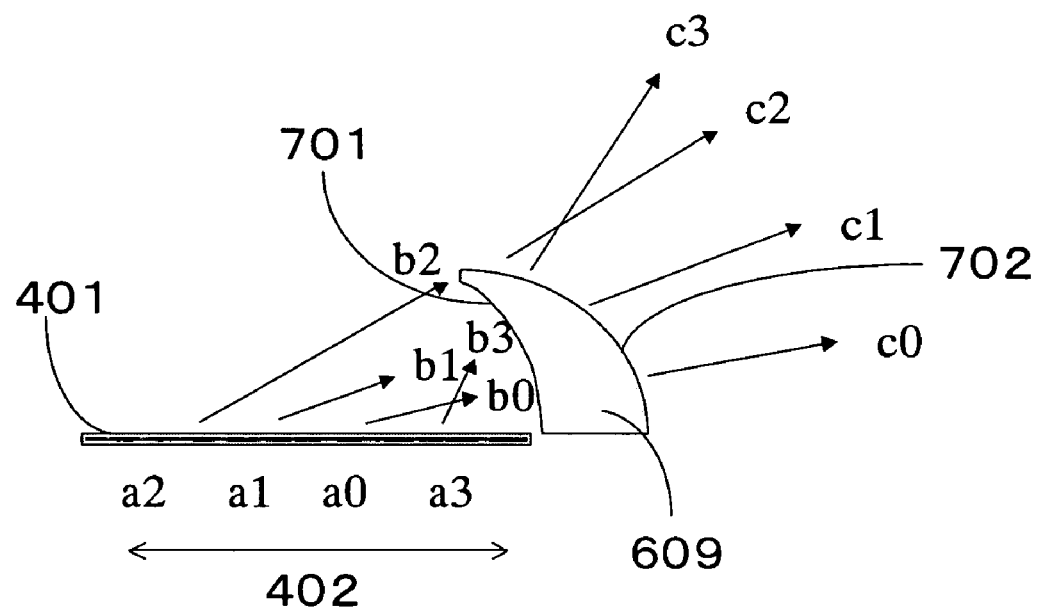
FIG. 30 shows another example of a circularly arced transparent member as the transparent member.

FIG. 30 shows another example of arced transparent member 609 for the transparent member 703 of FIG. 25, realized by shaping the inner contour 701 as an inward arc to protrude over the object. This makes it possible to cover a peripheral part of the CD-ROM's printed surface 401, and thereby to see the printed surface not only horizontally from the side as in the previous configurations but also obliquely from above, as the reflected light goes through a3→b3→c3. As a result, a large visible area 402 and a wider angle of viewing are achieved. As the printed surface can be seen not only straight from the side but also obliquely, just like the spine of a book, this arrangement would be of greater use. Further, though arcs are used in this example as the outer contour 702 and the inner contour 701, some other structures of a transparent member covering the peripheral part of a CD-ROM can be readily realized by using a combination of a conventional curve such as an oval or a parabola with a rectangle or a straight line.

Figure 31:
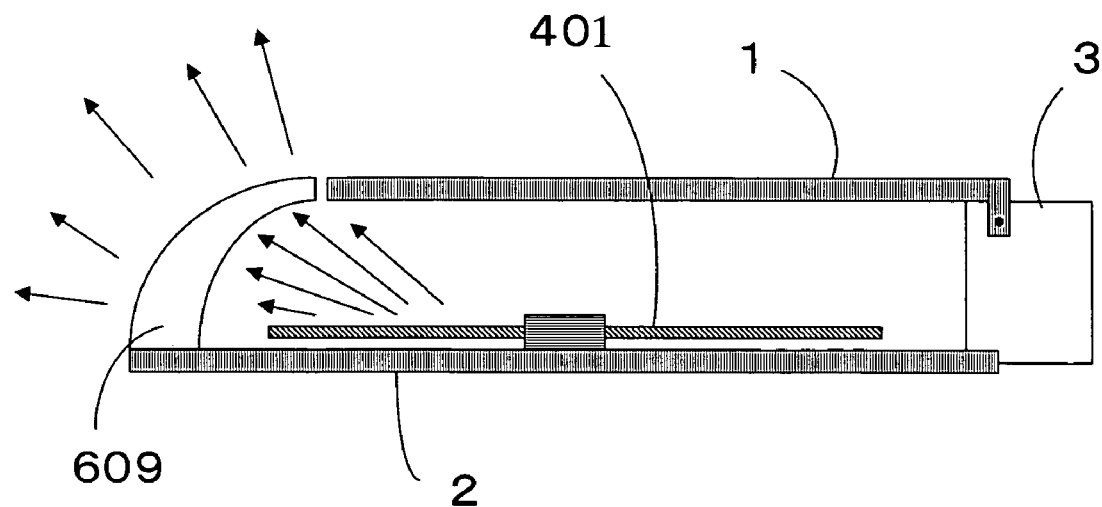
FIG. 31 shows a case according to still another embodiment of the invention.

FIG. 31 shows a case according to still another embodiment of the invention. As the transparent member, the arced transparent member 609 shown in FIG. 30 is used. This transparent member 609 is curved toward the inside, where an object is to be kept, from the bottom to the top. Though the optically transparent member 609 here is fitted to the bottom 2 in such a way as covers part of the visible area 402 of the CD-ROM, it can as well be fitted to the top 1. Whereas in this embodiment it is situated in the position of the front 201, it may be similarly applied to other sides, i.e., the flanks 101 and the back 202. Further in terms of external shape, the straight type 706, the curved type 707 and the curved lens type 708 shown in FIG. 26 are also applicable.

Figure 32:
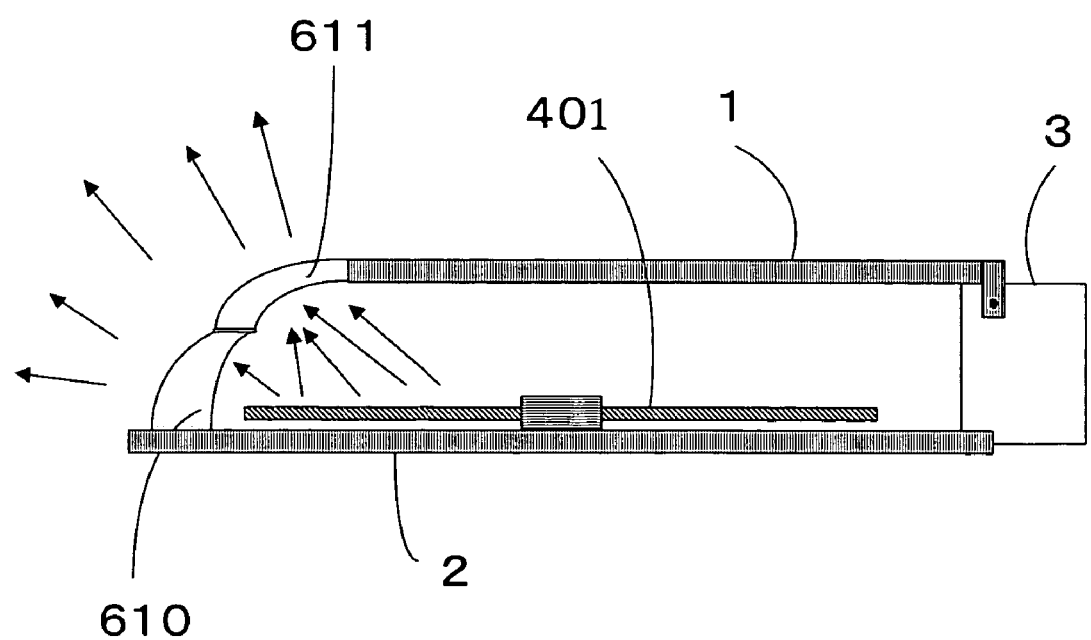
FIG. 32 shows a case according to still another embodiment of the invention.

FIG. 32 shows a case according to still another embodiment of the invention. In this embodiment, a transparent member lower part 610 and a transparent member upper part 611, resulting from the vertical division of the circularly arced transparent member 609 of FIG. 30 are fitted to the bottom 2 and the top 1, respectively, as transparent members. Whereas in this example they are situated in the position of the front 201, they may be similarly applied to other sides, i.e., the flanks 101 and the back 202. Further in terms of external shape, the straight type 706, the curved type 707 and the curved lens type 708 shown in FIG. 26 are also applicable.

Figure 33:
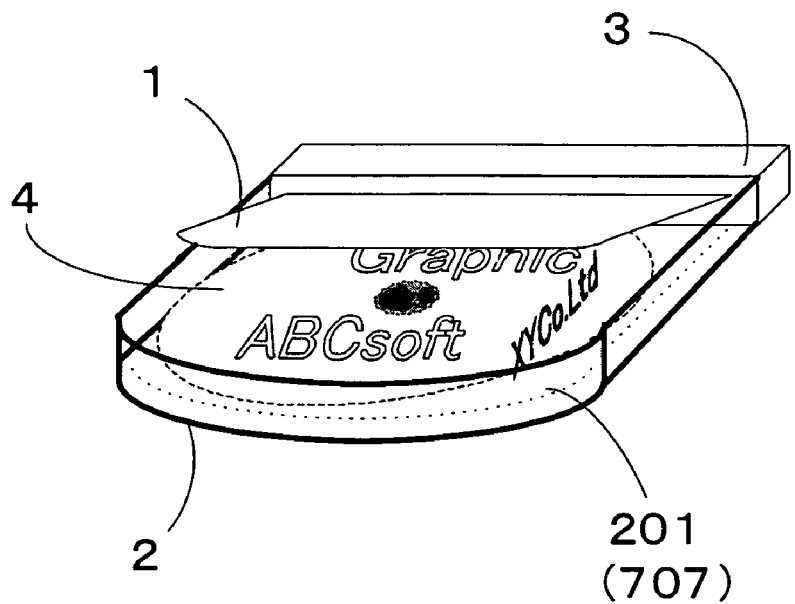
FIG. 33 shows a case according to still another embodiment of the invention.

FIG. 33 shows an external view of a case according to a further embodiment of the invention. The transparent member 707 is curved convexly from the central part to the two end parts in the lengthwise direction. This drawing shows the external view of a case in which a transparent member of the curved type 707 is used in the position of the front side 201, and both the top 1 and the bottom 2 are matched with the curve of the transparent member of the curved type 707. Not only the curved type 707 but also the curved lens type 708 can be applied.

Figure 18:
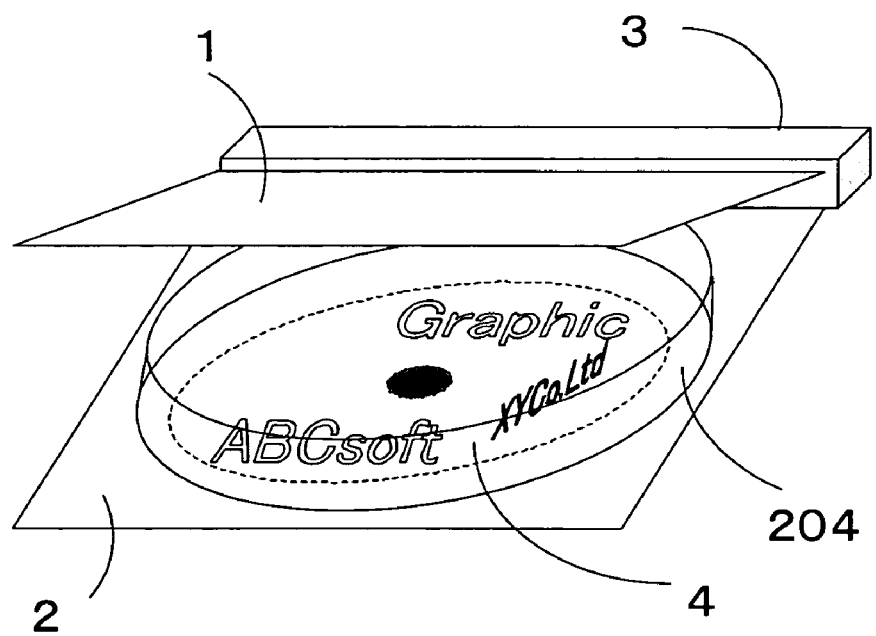
FIG. 18 shows an external view of another embodiment of the invention.

FIG. 18 shows the external view of a case according to a further embodiment of the invention. In this drawing, reference number 204 denotes a cylindrical side, using either a whole or a partial cylindrical shape.

This side connects the front 201, the back 202 and the flanks 101 in the foregoing description into a cylindrical shape. The cylindrical side 204 is realized by rounding the linear shape of earlier embodiments into a cylindrical shape without altering the essential parts of the invention regarding the cross-sectional shapes of the convex and concave lenses and the prism. The cylindrical side 204 need not constitute a full circle; a partial circle may also be appropriate.

This arrangement makes visible the printed surface not just in the four directions in the foregoing embodiments but in an even wider-angle portion of the sides.

The above-described transparent member can be fitted to either the top 1 or the bottom 2 as long as the orientation and topological relationships relative to the object placed on the bottom are maintained.

Figure 19:
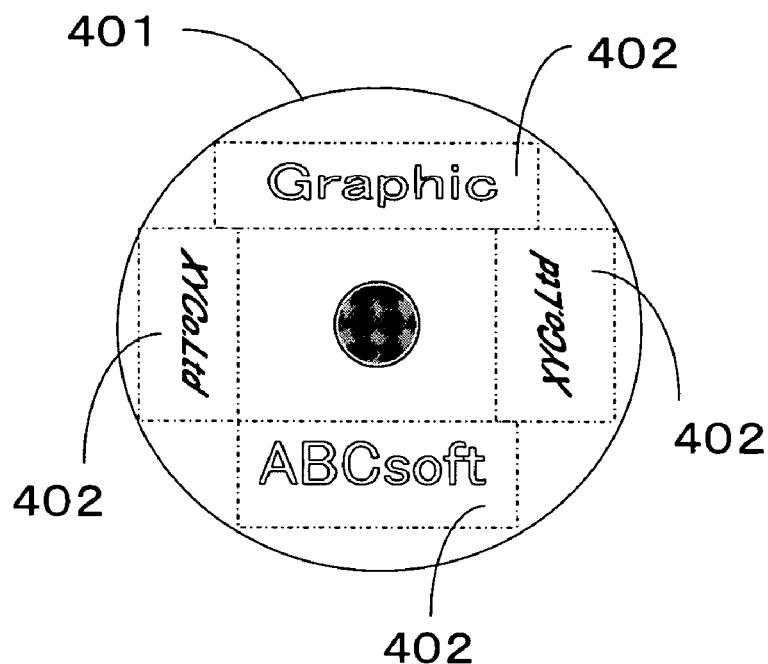
FIG. 19 is a print layout on the printed surface of a CD-ROM.

FIG. 19 shows a print layout of the CD-ROM's printed surface 401.

As shown in FIG. 8, the printed face is laid out in a reverse process to contain it in the visible areas 402 so that the contents of the CD-ROM printed face 401 can be effectively read within the field of view. In view of this point, it is preferable to print useful information in such areas of the CD-ROM printed face 401 as correspond to the visible areas 402.

This enables the image from the thin side or sides to be grasped as useful information. This arrangement can be applied not only to the CD-ROM printed face 401 but also to other objects, particularly other recording media.

Figure 20:
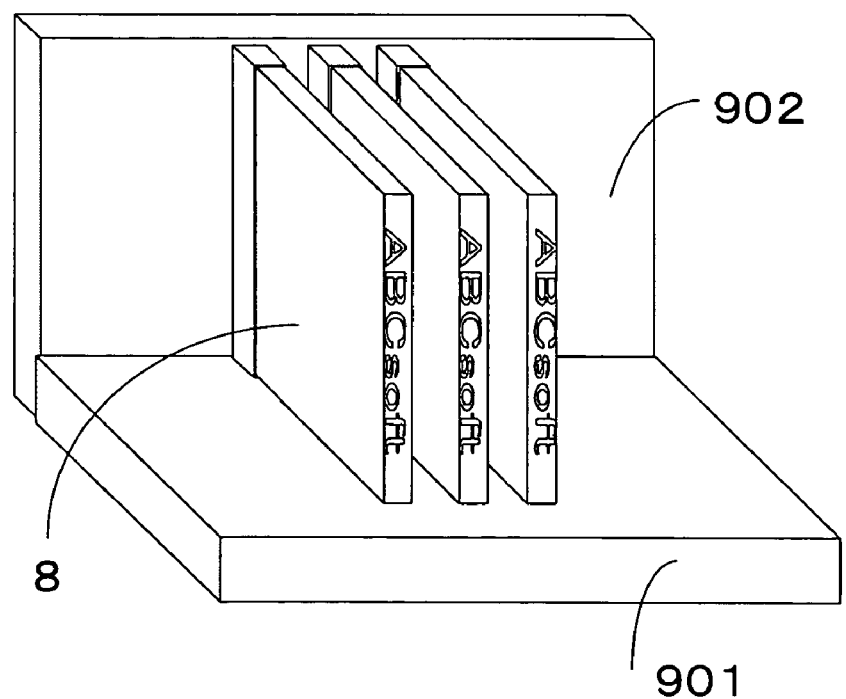
FIG. 20 shows an external view of a case holder in one mode of implementing the invention.

FIG. 20 shows the external view of a case holder for containing the above described cases according to a preferred embodiment of the invention. It illustrates an arrangement of a shelf base 901 and a back 902 as in a bookshelf.

On the shelf base 901 are placed such cases 8 as were described above.

With the prior art, it is difficult to locate, among a number of similar-looking cases, any particular one unless each of these cases has a spine label indicating its contents.

Figure 21:
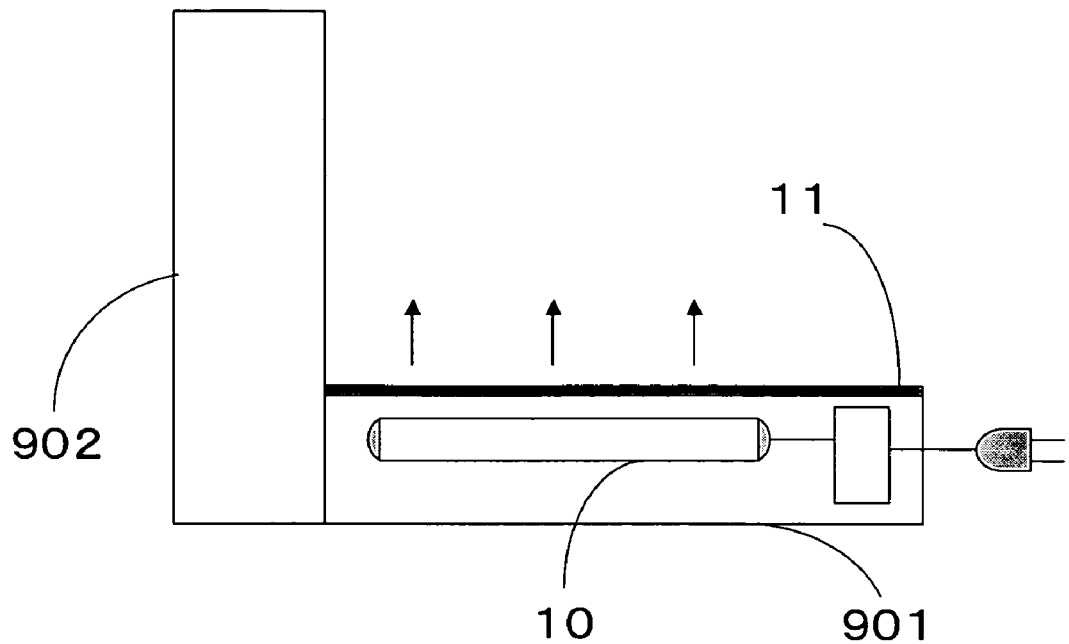
FIG. 21 shows an internal structure embodying a contrivance in a shelf base.

FIG. 21 shows an internal structure in which the shelf base 901 embodies a contrivance in addition to the contrivances regarding the case and the recording medium described so far. The shelf base 901, as illustrated here, is provided with a light-emitting unit 10 and a transparent panel 11. The light emitted from the light-emitting unit 10 passes through the transparent panel 11 and enters one or more cases 8 through their sides that are placed on the shelf base 901. Because of the reflection taking place inside each case 8, this arrangement makes it easier to view its contents from anywhere else than through the side of the light source.

Here, by using a transparent panel 11 of a material that can multi-directionally diffuse light, such as translucent ground glass or lenticular glass, highly directional reflections on the CD-ROM's printed surface 401 can be prevented to make the CD-ROM's printed surface 401 easier to read.

Although the light emitting unit 10 is so disposed as to emit light from its lower part in this example, it is also possible to arrange one or more light-emitting units 10 in the back 902 or in other places to supply light through more than one side.

Figure 34:
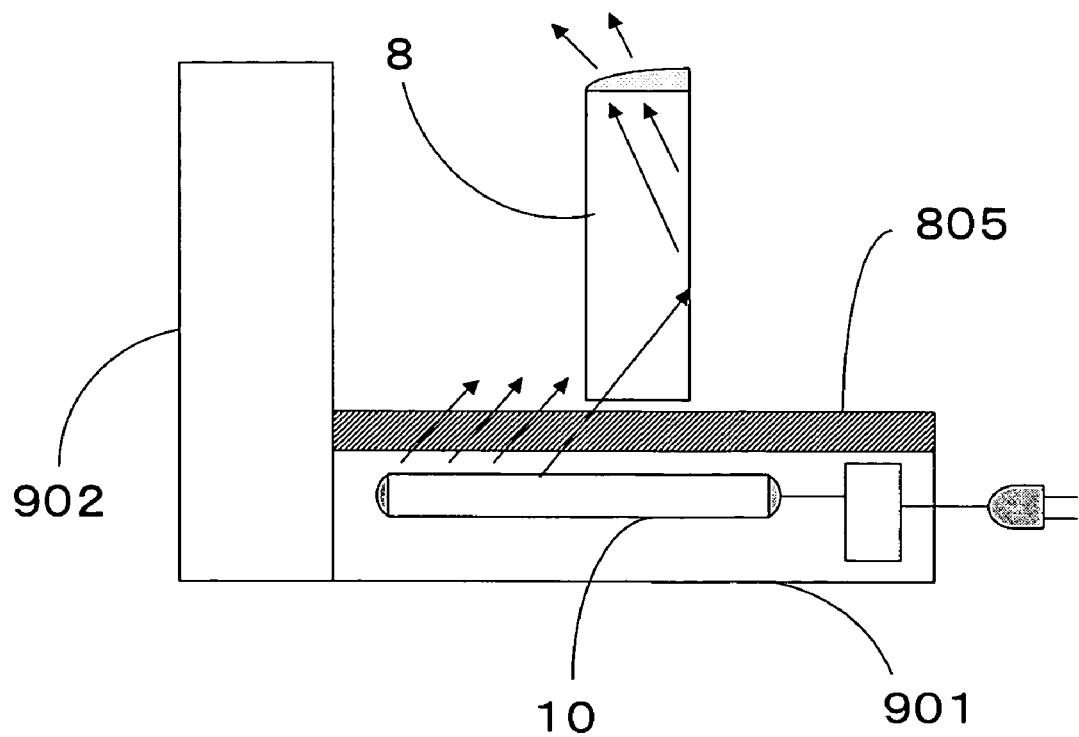
FIG. 34 shows another internal structure embodying a contrivance in a shelf base.

FIG. 34 shows another structure which uses as the transparent panel 11 for the case holder a prism panel 805 comprising a plurality of prisms densely arranged in rows to adjust the angle of light emission. This structure allows the light transmitted through the prism panel 805 to enter one side of each case 8 at such an optimum angle that once reflected from the CD-ROM'sprinted surface 401 it goes through the transparent member situated on the opposite side. This prevents undesired reflection from reflective surfaces and makes the printed surface easier to read. Instead of the prism panel 805, some other optical means for scattering or condensing light can be used as well.

Figure 22:
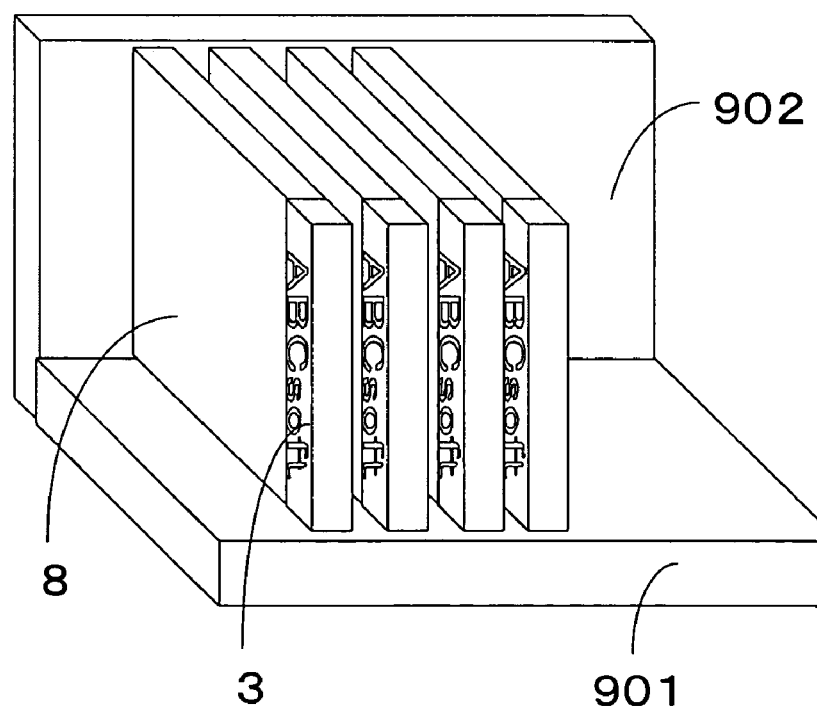
FIG. 22 shows an arrangement in which an image from a light-guiding member in the back hinge is made visible.

The external view shown in FIG. 22 shows an arrangement in which an image from the light-guiding member 301 in the back hinge 3 is made visible. A staggered or slanted arrangement is also possible.

The light-emitting unit 10 here need not be an electric lamp, but indirect illumination, such as reflection from a mirror, may be used instead.

INDUSTRIAL APPLICATIONS

The invention can generally provide the following advantages:
(1) The object kept within the case, such as a recording medium, can be recognized through a side of the case without having to alter the size of the case.
(2) The cost of designing, printing and fitting a label to match the object to be kept in the case, such as a recording medium, can be reduced or eliminated.
(3) The case containing the object searched for, such as the recording medium looked for, can be more easily located even if it has no spine label.
(4) The trouble of putting on a spine label can be dispensed with.
(5) The man-hours spent on management, such as matching the case with the object that is contained, for instance the recording medium stored in it, can be reduced.
(6) By making all the transparent members out of the same material as that for the case itself, the case can be mass-manufactured by molding, which minimizes the increase in cost, if any.

The invention claimed is:

1. A case for storing therein, on a bottom thereof, a planar-shaped object having a bottom surface, a top surface, and information disposed on the top surface thereof, said case comprising:

(a) a top having a first end and a second end, (b) a bottom arranged facing the top, said bottom having a first end and a second end;

(c) an interior portion positioned between the top and the bottom, for storage of a planar-shaped object; and (d) at least one transparent side disposed at one said end of the top and bottom of the case, (i) said at least said one transparent side having a first transparent member comprised of a part of a convex lens having a first face adjacent the interior portion of the case and a second face opposite the first face, said first transparent member capable of causing a bundle of light rays to converge, refractivity of the first transparent member gradually increasing in the direction from the bottom to the top, or (ii) said at least one transparent side having a second transparent member comprised of a part of a concave lens having a first face adjacent the interior portion of the case and a second face opposite the first face, said second transparent member capable of causing a bundle of light rays to diverge, refractivity of the second transparent member gradually increasing in the direction of from the top to the bottom, whereby a virtual image of at least a portion of information on a top of the planar-shaped object when stored within the case will appear rising out of an actual plane of the planar-shaped object when viewed from said at least one transparent side through either said first transparent member or said second transparent member.

2. The case according to claim 1, wherein the first face of the part of the convex lens of the first transparent member is inclined, from a bottom to a top thereof, towards the interior portion of the case, in which the planar-shaped object is to be stored.

3. The case according to claim 1, wherein said first transparent member or said second transparent member has a straight, curved or a curved lens shape.

4. The case according to claim 1, wherein said first transparent member or said second transparent member is curved in a cylindrical manner, such that the first transparent member or the second transparent member partially or wholly encircles the interior portion of the case in which the planar-shaped object is to be stored.

5. The case according to claim 1, wherein said at least one transparent side of the case further comprises a light-guiding member disposed adjacent the second face of the first or second transparent member, said light-guiding member functioning to bend the path of light transmitted through said at least one transparent side.

6. The case according to claim 1, wherein said case is made of transparent material.

* * * * *